(12) United States Patent
Mirza

(10) Patent No.: US 7,688,733 B1
(45) Date of Patent: Mar. 30, 2010

(54) SYSTEM AND METHOD FOR BANDWIDTH SELECTION IN A COMMUNICATION NETWORK

(75) Inventor: Nasir Mahmood Mirza, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1381 days.

(21) Appl. No.: 10/633,800

(22) Filed: Aug. 4, 2003

(51) Int. Cl.
*H04L 12/56* (2006.01)
*H04J 3/14* (2006.01)

(52) U.S. Cl. .................. 370/235; 370/468; 709/228; 709/233

(58) Field of Classification Search .............. 370/230.1, 370/235, 468; 709/226, 228, 229, 231, 233; 711/162
See application file for complete search history.

(56) References Cited

U.S. PATENT DOCUMENTS

| | | | |
|---|---|---|---|
| 5,867,483 A * | 2/1999 | Ennis et al. ................. 370/252 |
| 6,249,530 B1 | 6/2001 | Blanco et al. |
| 6,356,945 B1 | 3/2002 | Shaw et al. |
| 6,366,761 B1 | 4/2002 | Montpetit |
| 6,463,280 B1 | 10/2002 | Takahashi et al. |
| 6,538,669 B1* | 3/2003 | Lagueux et al. ............. 715/764 |
| 6,578,077 B1* | 6/2003 | Rakoshitz et al. ........... 709/224 |
| 6,975,594 B1* | 12/2005 | Byers ......................... 370/238 |
| 6,977,927 B1* | 12/2005 | Bates et al. ................. 370/381 |
| 7,136,645 B2* | 11/2006 | Hanson et al. ........... 455/435.1 |
| 7,185,082 B1* | 2/2007 | del Val et al. ............... 709/224 |
| 7,275,103 B1* | 9/2007 | Thrasher et al. ............. 709/224 |
| 7,277,431 B2* | 10/2007 | Walter et al. ................ 370/389 |
| 7,415,038 B2* | 8/2008 | Ullmann et al. ............. 370/468 |
| 7,512,888 B2* | 3/2009 | Sugino et al. ............... 715/734 |
| 2003/0002529 A1* | 1/2003 | Gibbons et al. ............. 370/468 |
| 2003/0018772 A1* | 1/2003 | Meandzija et al. .......... 709/223 |
| 2003/0055972 A1* | 3/2003 | Fuller et al. ................. 709/226 |
| 2003/0079019 A1* | 4/2003 | Lolayekar et al. ........... 709/226 |
| 2003/0093619 A1* | 5/2003 | Sugino et al. ............... 711/114 |
| 2003/0212792 A1* | 11/2003 | Raymond .................... 709/225 |
| 2003/0236884 A1* | 12/2003 | Yamamoto et al. .......... 709/225 |
| 2004/0042489 A1* | 3/2004 | Messick et al. ............. 370/468 |
| 2004/0044770 A1* | 3/2004 | Messick et al. ............. 709/226 |
| 2004/0122938 A1* | 6/2004 | Messick et al. ............. 709/224 |
| 2004/0123063 A1* | 6/2004 | Dalal et al. ................. 711/170 |

\* cited by examiner

*Primary Examiner*—Chi H Pham
*Assistant Examiner*—Ahmed Elallam

(57) ABSTRACT

A communication control system for bandwidth selection in a communication network includes a display device, an input device, a communication interface configured to transfer a bandwidth selection command to the communication network, and a processing system. The processing system is configured to display a graphical bandwidth selection indicium on the display device. The graphical bandwidth selection indicium includes two or more bandwidth indicia. The processing system is further configured to receive a user input from the input device in response to the graphical bandwidth selection indicium. The user input selects a particular bandwidth indicium of the two or more bandwidth indicia. The processing system is further configured to translate the user input into the bandwidth selection command and transfer the bandwidth selection command to the communication interface. The user input generates bandwidth selection command for a communication session in the communication network.

19 Claims, 5 Drawing Sheets

SYSTEM AND METHOD FOR BANDWIDTH SELECTION IN A COMMUNICATION NETWORK

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to bandwidth selection in a communication network.

2. Description of the Prior Art

Many institutions, such as businesses and corporations, have computer systems that are used for many purposes, such as bookkeeping, records, inventory, communications, document processing, employee and customer records, technical or informational databases, etc. It is no exaggeration to say that a computer system has become an indispensable part of most institutions.

Obtaining and maintaining information is very important to most institutions. Therefore, preventing the loss of computerized information is very critical. Consequently, most institutions have some manner of disaster recovery plan, wherein data is mirrored (i.e., copied and stored) at a physically remote location. The mirroring typically is performed on a periodic basis, but can also be done at the initiation of a system operator or upon creation and/or modification of data. In the event of data loss, whether complete or partial, the mirrored data can be used to reclaim files and maintain operation of the institutional computer system.

FIG. 1 is a diagram of a mirroring system according to the prior art. In the prior art, the institution accesses and uses a mirror site that includes a mass data storage capability. A common mirror site is a Storage Area Network (SAN) that includes mass storage devices and a controller that are available over a communication network. Multiple institutions can access the SAN over the communication network and store and retrieve data.

The communication network can comprise any manner of network. In one example, the communication network is a packet network, such as the Internet, for example. However, a packet network is of a low bandwidth and relatively slow, can experience varying levels of traffic congestion, and can be an impediment to efficient storage operation when a large amount of data is to be mirrored. Another prior art approach has been to use a switched network that employs a dedicated, point-to-point connection for data transfer. One example of such a network is an optical fiber, switched telephone system.

However, the drawback in the prior art approach to mirroring has been that SANs are unforgiving of delay. Delay in a mass data transmission, such as transmission delay due to a relatively low bandwidth level, can increase the data latency. The data latency can result in storage of individual portions of data that lags in time from actual changes in the original data. Consequently, when high data latency is present, a failure at the institutional computer system can result in some data being irretrievably lost, i.e., data that was in transmission and that was not yet backed up at the destination. As a result, large institutions seek to use the highest available bandwidth that can be cost justified. However, in the prior art, this has led to a situation where a trade-off decision had to be made between reliability and cost. In addition, a communication link bandwidth that is acceptable at one point in time can be too slow during a subsequent mirroring session.

The prior art approach is generally to use a pre-assigned bandwidth for all mass data transfers. This prior art approach does not give a system operator choices as to what bandwidth can be used in order to avoid traffic congestion problems and successfully accomplish a mirroring operation. If the prior art allows a bandwidth selection or configuration, the system operator must perform pre-selection when access is purchased or must be able to generate and format relatively complicated system commands, and cannot easily and quickly select an appropriate bandwidth for a mirroring session.

SUMMARY OF THE INVENTION

A communication control system for bandwidth selection in a communication network is provided according to an embodiment of the invention. The communication control system comprises a display device, an input device, a communication interface configured to transfer a bandwidth selection command to the communication network, and a processing system. The processing system is configured to display a graphical bandwidth selection indicium on the display device. The graphical bandwidth selection indicium comprises two or more bandwidth indicia. The processing system is further configured to receive a user input from the input device in response to the graphical bandwidth selection indicium. The user input selects a particular bandwidth indicium of the two or more bandwidth indicia. The processing system is further configured to translate the user input into the bandwidth selection command and transfer the bandwidth selection command to the communication interface. The user input generates the bandwidth selection command for a communication session in the communication network.

A method for bandwidth selection in a communication network is provided according to an embodiment of the invention. The method comprises displaying a graphical bandwidth selection indicium. The graphical bandwidth selection indicium comprises two or more bandwidth indicia. The method further comprises receiving a user input in response to the graphical bandwidth selection indicium. The user input selects a particular bandwidth indicium of the two or more bandwidth indicia. The method further comprises translating the user input into a bandwidth selection command and transferring the bandwidth selection command to the communication network. The user input generates the bandwidth selection command for a communication session in the communication network.

BRIEF DESCRIPTION OF THE DRAWINGS

The same reference number represents the same element on all drawings.

DETAILED DESCRIPTION OF THE PREFERRED EMBODIMENT

FIGS. 2-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
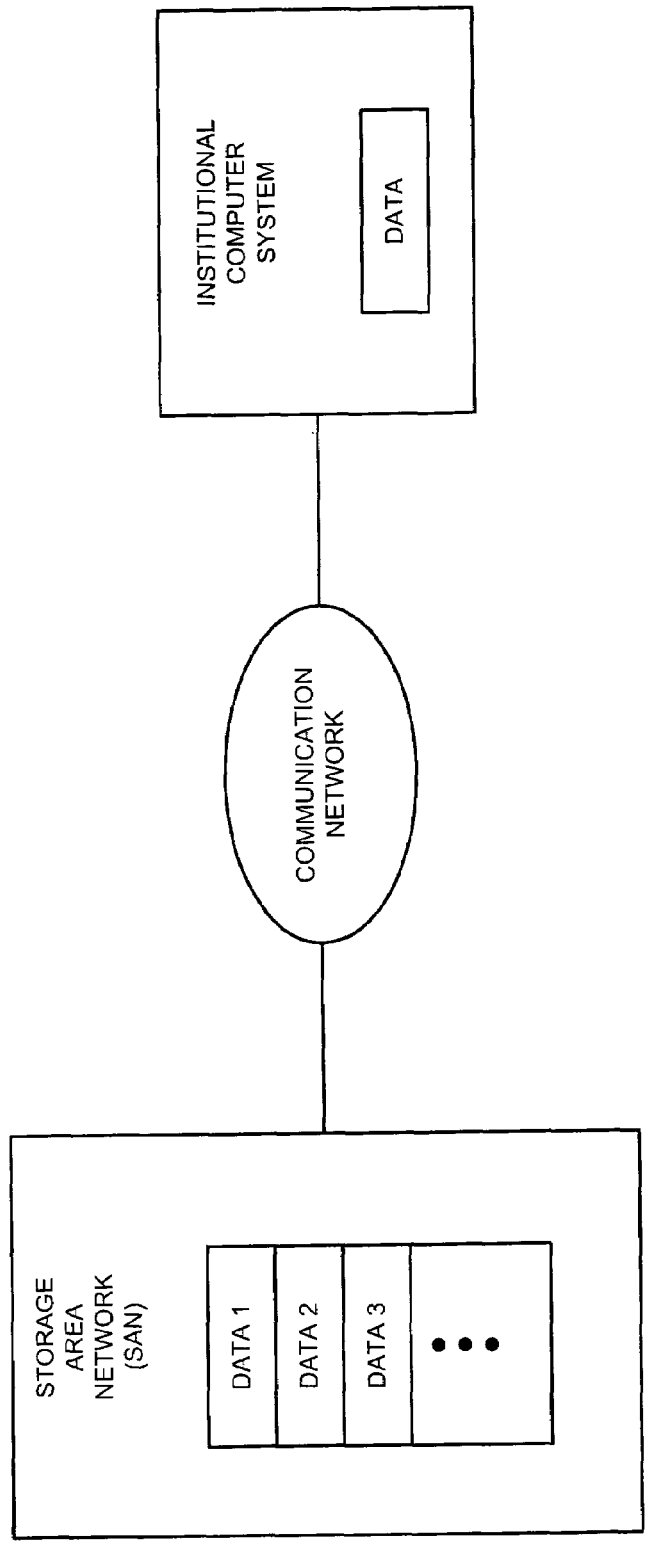
FIG. 1 is a diagram of a mirroring system according to the prior art.
Figure 2:
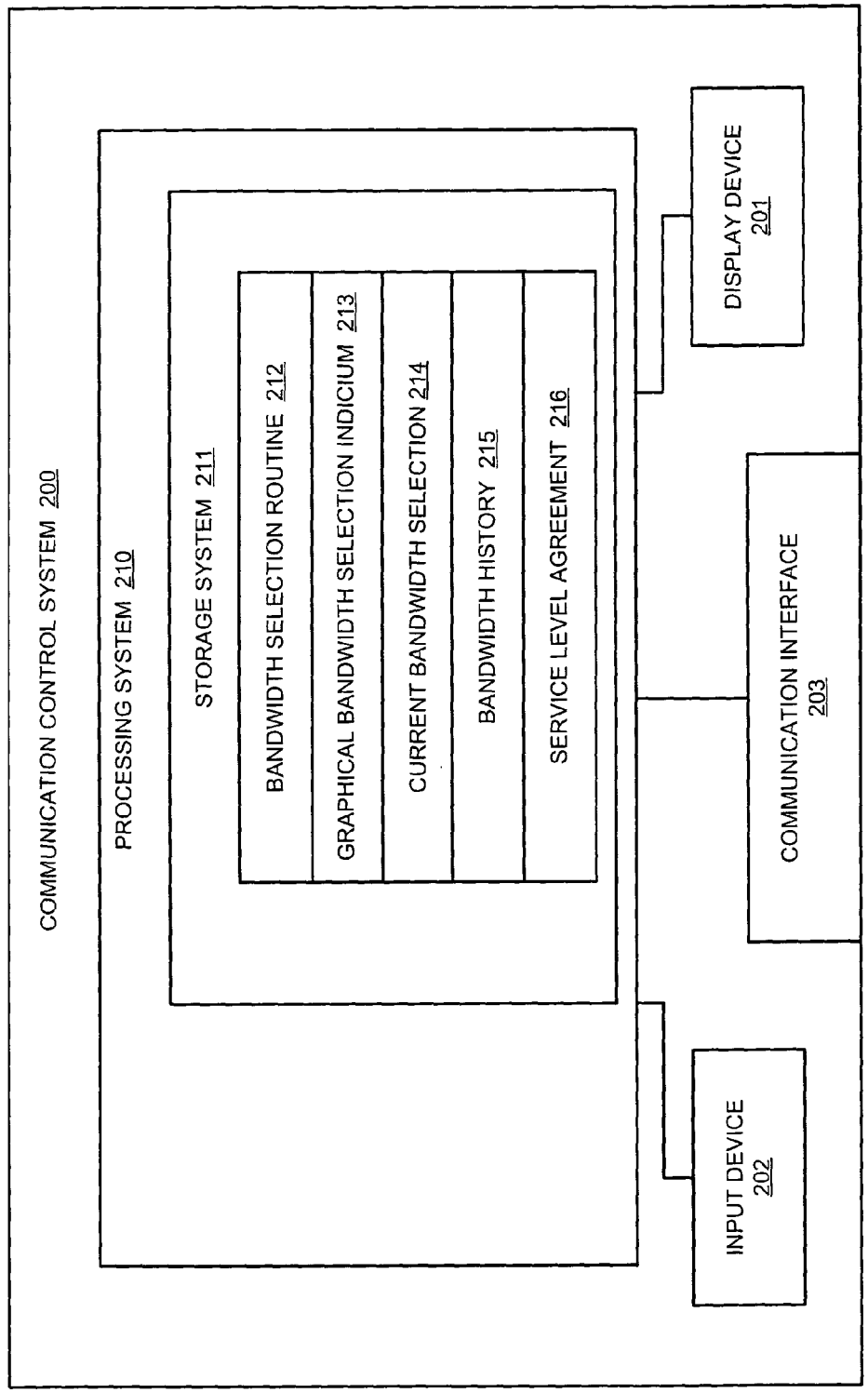
FIG. 2 shows a communication control system for bandwidth selection in a communication network according to an embodiment of the invention.

FIG. 2 shows a communication control system 200 for bandwidth selection in a communication network according to an embodiment of the invention. The communication control system 200 can perform a bandwidth selection for a communication session between at least a first switch and a second switch of a communication network 400 (see FIG. 4 and accompanying text). The bandwidth selection can be performed on an available or configured communication link or on a communication link selected by a user or operator.

The communication control system 200 includes a display device 201, an input device 202, a communication interface 203, and a processing system 210. The processing system 210 can include a storage system 211. The processing system 210 further includes a bandwidth selection routine 212, a graphical bandwidth selection indicium 213, and a current bandwidth selection 214. In addition, the processing system 210 can optionally include a bandwidth history 215 and a service level agreement 216.

In operation, the processing system 210 is configured to display the graphical bandwidth selection indicium 213 on the display device 201. The graphical bandwidth selection indicium 213 comprises two or more bandwidth indicia 514 (see FIG. 5). Subsequently, the processing system 210 receives a user input from the input device 202 in response to the graphical bandwidth selection indicium 213. The user input is generated by the input device 202 in response to the user selecting a particular bandwidth indicium of the two or more bandwidth indicia 514 (see FIG. 5). The processing system 210 translates the user input into a bandwidth selection command and transfers the bandwidth selection command the communication interface 203. The communication interface 203 transfers the bandwidth selection command to at least a first bandwidth controller associated with the first switch (see FIG. 4 and the accompanying discussion). As a result, a user or operator of the communication control system 200 can perform a one-click bandwidth selection for a communication link and for a communication session.

It should be understood that both the first and second switches (and associated bandwidth controllers) can receive the bandwidth selection command. In addition, any number of other switches participating in the communication session can receive the bandwidth selection command and act on the command to set a bandwidth level. Consequently, the user input selects a communication bandwidth for a communication session between at least the first switch and the second switch.

The graphical bandwidth selection indicium 213 can be associated with or represent a specific communication link. In one embodiment, the communication link is chosen by the user or operator. A communication link can comprise an access node-to-access node communication link. Alternatively, the communication link can comprise a switch-to-switch communication link or can comprise a communication network device-to-network device communication link. The bandwidth selection therefore operates on a selected communication link, and can perform bandwidth selection for all or part of a communication path of a communication session.

The display device 201 generates a graphical display to a user. The display device 201 can comprise a cathode-ray tube (CRT), LCD screen, LED screen, etc. The graphical display can include a display screen 500 generated on the display device 201 (see FIG. 5 and the accompanying discussion).

The input device 202 can comprise any kind of input device for the communication control system 200. For example, the input device 202 can include a keyboard, keypad, mouse, pointing device, etc. The input device 202 can accept a user input that corresponds to a particular display region on the display device 201. It should be understood that in one embodiment the display device 201 and the input device 202 can comprise a single device, such as a touch screen, for example.

Figure 4:
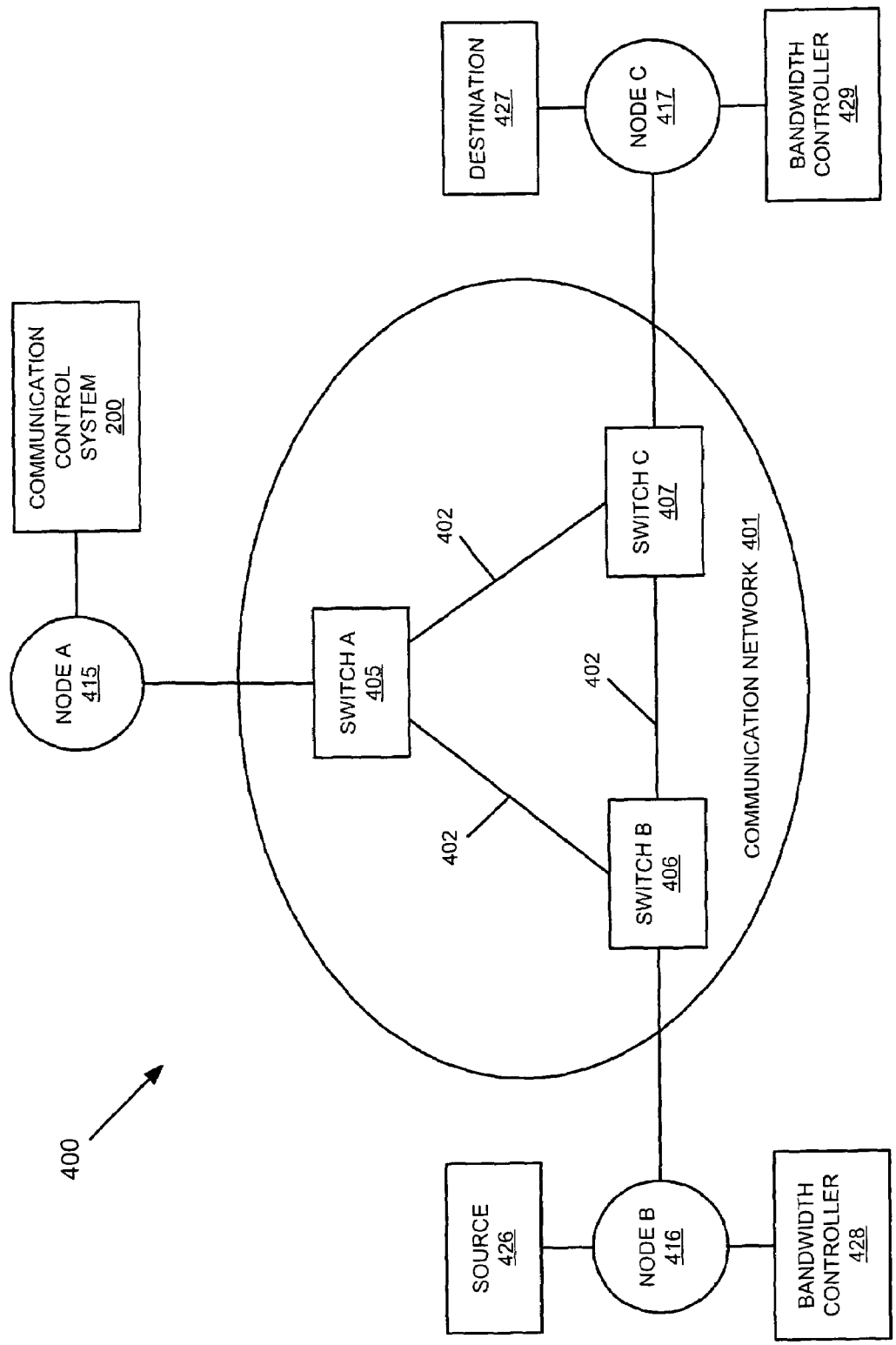
FIG. 4 shows a communication system according to an embodiment of the invention.

The communication interface 203 conducts communications between the communication control system 200 and a communication network 401 (see FIG. 4). The communication interface 203 can comprise a modem, network card, or specialized communication device. The communication interface 203 can be connected to and communicate directly with a node, switch, or bandwidth controller of the communication network 401. Alternatively, the communication interface 203 communicates indirectly with the above-mentioned components, such as through an access node or access provider.

The processing system 210 conducts operations of the communication control system 200. The processing system 210 could comprise a general purpose computer, a microprocessing system, a logic circuit, or some other general purpose or customized processing device. The processing system 210 may be distributed among multiple processing devices. The processing system 210 can include any manner of integral or independent electronic storage medium, such as the storage system 211.

The processing system 210 executes the bandwidth selection routine 212. When executing the bandwidth selection routine 212, the processing system 210 accesses and displays the graphical bandwidth selection indicium 213, generates a display to the display device 201, receives and interprets inputs from the input device 202, and translates a user input into a bandwidth selection command.

The graphical bandwidth selection indicium 213 generates a graphical bandwidth selection indicium on the display device 201 when executed by the processing system 210. The graphical bandwidth selection indicium 213 can comprise two or more bandwidth indicia 514 for a communication link (see FIG. 5). The two or more bandwidth indicia 514 can comprise graphical buttons, checkboxes, etc., that graphically display a bandwidth selection option. When a cursor or pointer is positioned over a particular bandwidth indicium 514, it can be selected by a user input.

The current bandwidth selection 214 stores the bandwidth selection previously made by the user and currently being used in any ongoing communication session. Therefore, the current bandwidth selection 214 changes when the user selects a new bandwidth level.

The bandwidth selection routine 212 translates a user input of a particular bandwidth indicium 514 into a bandwidth selection command. The bandwidth selection command is in a format appropriate for transmission to a bandwidth controller and commands the bandwidth controller to select a predetermined bandwidth.

The bandwidth history 215 stores one or more previous bandwidth selections. Each user can have a stored and displayed bandwidth history 215. The bandwidth history 215 can be included to show historic bandwidth usage. In addition, the bandwidth history 215 can be used to spot trends in bandwidth usage and therefore can be used to predict or anticipate a current bandwidth need.

The service level agreement 216 stores and displays a service level agreement that can determine the bandwidth levels available to the user. For example, a corporation or other entity could pay for three bandwidth levels, and the service level agreement could control when or how often a high bandwidth level is selected. For example, the user could review the pricing listed in the service level agreement for each bandwidth level when deciding on a bandwidth level to select. In addition, the service level agreement 216 can inform the user of any limitations on bandwidth selection.

Figure 3:
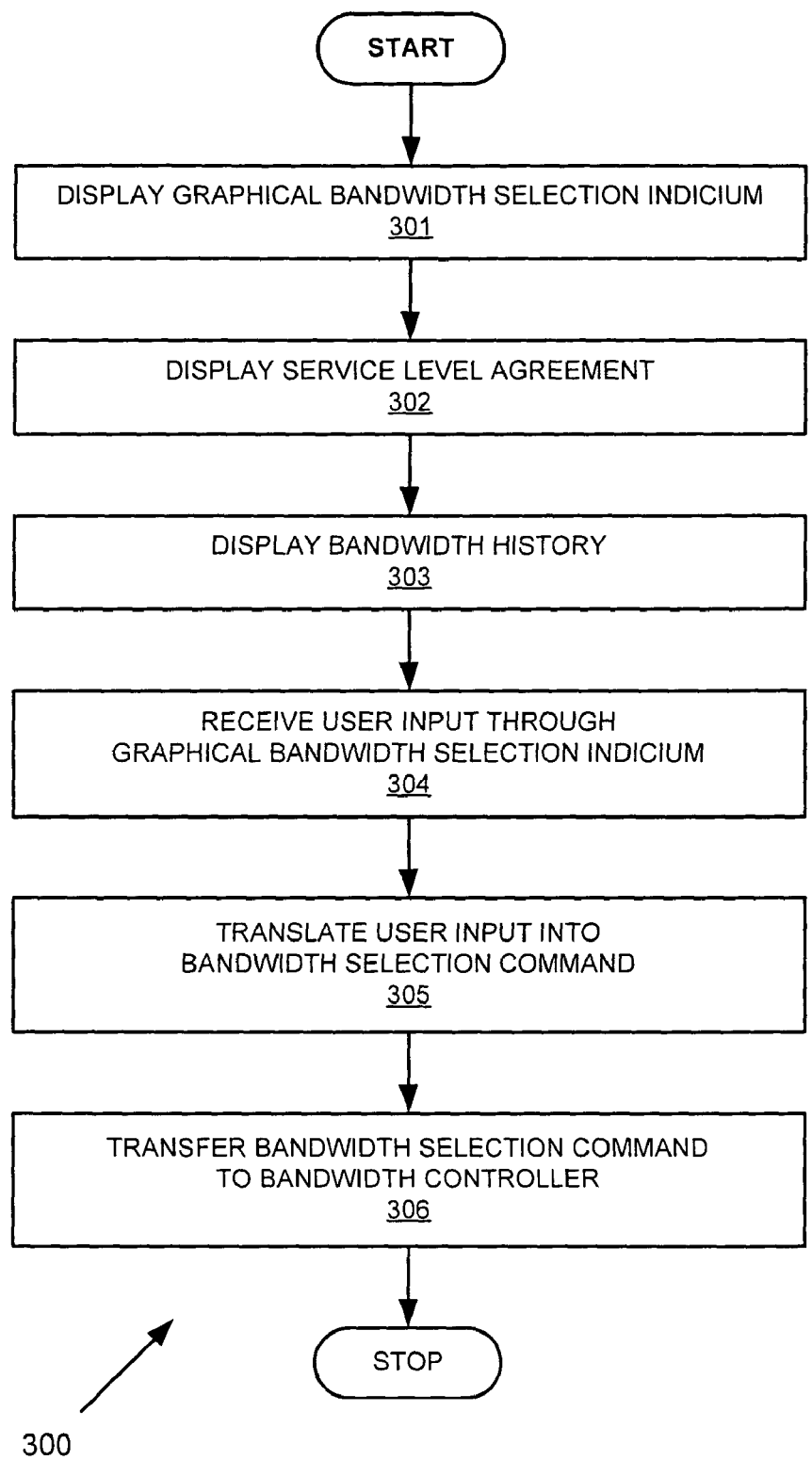
FIG. 3 is a flowchart of a method for bandwidth selection in a communication network according to an embodiment of the invention.

FIG. 3 is a flowchart 300 of a method for bandwidth selection in a communication network according to an embodiment of the invention. The bandwidth selection can be performed for a communication session. In step 301, a graphical bandwidth selection indicium 213 is displayed. The graphical bandwidth selection indicium 213 can be displayed on a display device 201 of a communication control system 200, for example. The graphical bandwidth selection indicium 213 graphically represents and depicts two or more bandwidth indicia 514 that can be selected by a user in order to select a bandwidth level for the communication session.

Figure 5:
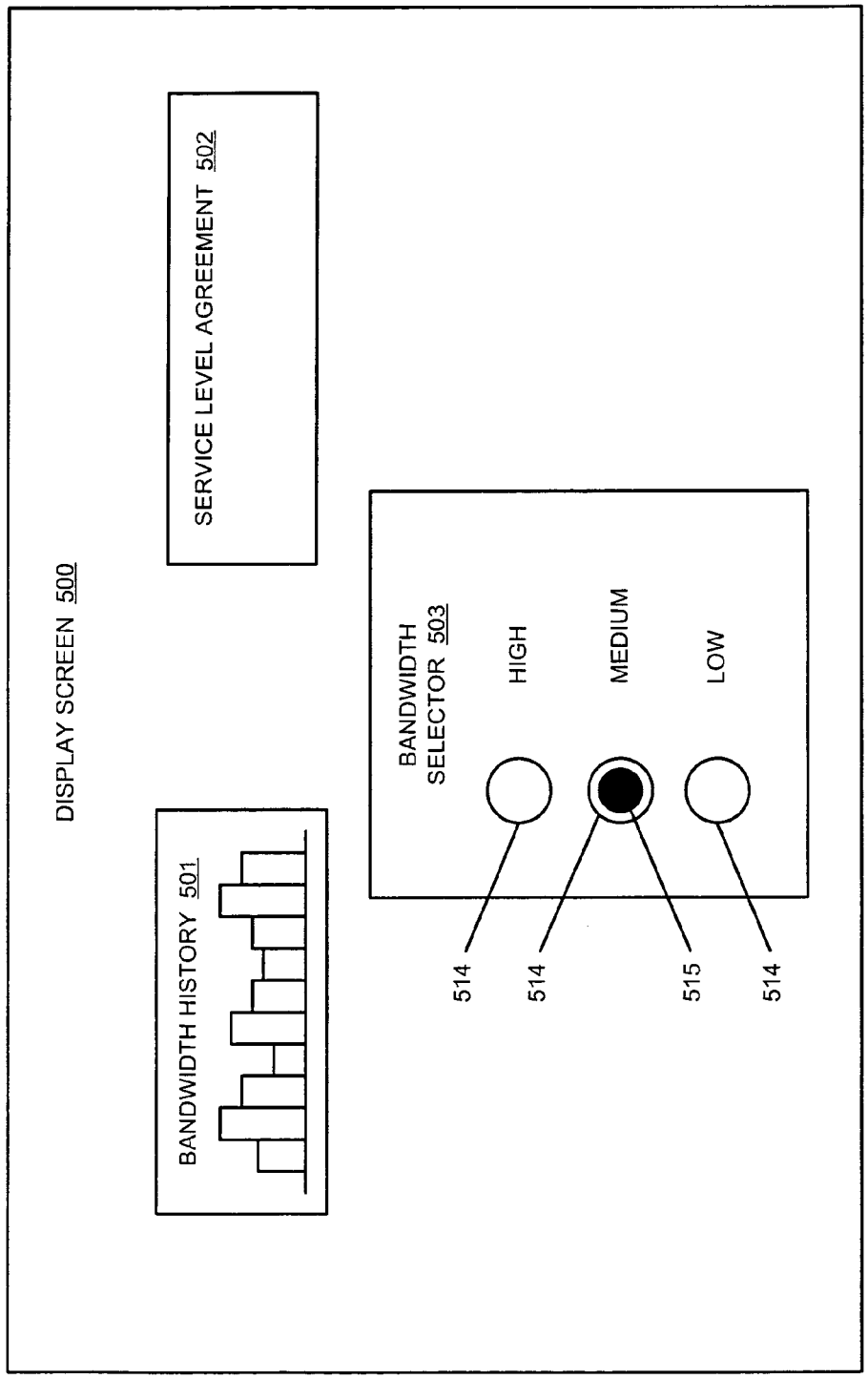
FIG. 5 shows a display screen that can be generated on a display device according to an embodiment of the invention.

In step 302, a service level agreement can optionally be displayed along with the graphical bandwidth selection indicium 213 (see FIG. 5 and the accompanying discussion). The service level agreement can provide information about available bandwidth levels. In addition, the service level agreement can inform the user of any restrictions on the selection or use of the available bandwidth levels.

In step 303, a bandwidth history can optionally be displayed along with the graphical bandwidth selection indicium 213 (see FIG. 5 and the accompanying discussion). The bandwidth history can graphically or textually depict a history of bandwidth selections by a particular user, institution, or account.

In step 304, a user input is received through the graphical bandwidth selection indicium 213. The user input represents a selection by a user of a displayed bandwidth level indicia 514 of the graphical bandwidth selection indicium 213. The user input is received through the input device 202 of the communication control system 200.

In step 305, the user input is translated into a bandwidth selection command. The bandwidth selection command is in a communication format and/or protocol for transmission to a bandwidth controller or controllers that set the bandwidth for the communication session.

In step 306, the bandwidth selection command is transferred to a bandwidth controller or controllers. As previously discussed, the transfer can be a direct transfer or alternatively the bandwidth selection command can be transferred through other nodes, devices, communication links, etc. The bandwidth controller or controllers set the bandwidth level over the applicable communication link.

FIG. 4 shows a communication system 400 according to an embodiment of the invention. The communication system 400 can include Node A 415, Node B 416, and Node C 417. The communication system 400 can further include switch A 405, switch B 406, and switch C 407. The Nodes 415-417 can be connected to or capable of communicating with the switches 405-407. The switches 405-407 can be components of a communication network 401, along with wires, cables, or fibers 402 that connect the switches 405-407. It should be understood that the communication network 401 can include additional switches and components that have been omitted from the drawing for purposes of clarity.

A communication link can comprise an access node-to-access node communication link. Alternatively, the communication link can comprise a switch-to-switch communication link or communication network device-to-network device communication link. The bandwidth selection therefore operates on a selected communication link, and can perform bandwidth selection for all or part of a communication path of a communication session.

In one embodiment, a switch comprises an Interface Aggregation Switch (IAS). An IAS can interface to Ethernet, Fiber Channel, Enterprise Systems CONnectivity (ESCON), or wireless communication channels or links, for example. The various communication channels and/or links can be selected among according to their bandwidth capacities.

The communication network 401 can comprise a switched communication network formed of wires or cables. Alternatively, the communication network 401 can comprise a switched network formed of optical fibers. In one embodiment, the communication network 401 comprises a Synchronous Optical NETwork (SONET) fiber optic network. In another embodiment, the communication network 401 comprises a Dense Wavelength Division Multiplexing (DWDM) fiber optic network.

In one embodiment, the communication control system 200 is connected to or communicating with Node A 415, as shown. Node A 415 can comprise any manner of access node or access provider that enables communication between the communication control system 200 and the communication network 401. In addition, Node A 415 can include a bandwidth allocator (BWA) device (not shown), and can further include an Operational Support Systems (OSS) capability. In this embodiment, the source 426 and the destination 427 are connected to or communicating with Node B 416 and Node C 417 in some manner (Node B 416 and Node C 417 can include the corresponding bandwidth controllers 428 and 429). It can be seen that in this embodiment the communication control system 200 is remote from both the source 426 and the destination 427. Therefore, in operation, the communication control system 200 transfers a bandwidth selection command to at least the bandwidth controller 428 associated with the source 426. If needed, the bandwidth selection command can also be transferred to the bandwidth controller 429 associated with the destination 427 (and also to any intervening bandwidth controllers). It should be understood that although the bandwidth controllers 428 and 429 are shown as being connected to Node B 416 and Node C 417, alternatively the bandwidth controllers 428 and 429 can instead be directly connected to switch B 406 and switch C 407, respectively.

In an alternative embodiment, the source 426 and the destination 427 are connected to or communicating with Node B 416 and Node C 417, as previously describe. However, in this alternative embodiment, the communication control system 200 is also connected to or communicating with either Node B 416 or Node C 417, and therefore can be a component of either the source 426 or the destination 427. As a result, the communication control system 200 is on-site with the source or destination computer system and controls the communication session between the two.

The communication session can comprise a data transfer, such as a mass data transfer, from the source 426 to the destination 427. For example, the communication session can comprise a data mirroring operation, wherein digital data from the source 426 is copied to and stored at a digital data storage at the destination 427. The destination 427 in one embodiment comprises a Storage Area Network (SAN). Proper bandwidth is very important in a data transfer to a SAN because a SAN is very intolerant to any delay in data transmission. Increasing physical distance to a SAN serves to increase the delay.

Delay in a mass data transmission, such as transmission delay due to a relatively low bandwidth level, can increase the data latency. The data latency can result in storage of individual portions of data that lags in time from actual changes in the original data. Consequently, when high data latency is present, a failure at the institutional computer system can result in some data being irretrievably lost, i.e., data that was in transmission and that was not yet backed up at the destination. As a result, large institutions seek to use the highest available bandwidth that can be cost justified. However, in the prior art, this has led to a situation where a trade-off decision had to be made between reliability and cost. The bandwidth selection according to the invention beneficially allows a bandwidth selection that is most suited for a data mirroring session, and allows a best bandwidth selection with regard to cost versus reliability.

FIG. 5 shows a display screen 500 that can be generated on the display device 201 according to an embodiment of the invention. The display screen 500 can include a bandwidth history display 501, a service level agreement display 502, and a graphical bandwidth selection indicium display 503.

The display screen 500 is generated for a selected communication link. As previously discussed, the communication link can comprise all or part of a communication path between a data source and a data destination. Therefore, the display screen 500 can also include a data link identifier(s) and/or other data link information. Consequently, a user or operator viewing the display screen 500 can perform a one-click bandwidth selection for the communication link and for a communication session.

The bandwidth history display 501 can display a bandwidth history for the communication link. The bandwidth history display 501 can comprise a graphical display, such as a graph, chart, histogram, etc. Alternatively, the bandwidth history display 501 can comprise a textual display or other history representation. The bandwidth history display 501 can depict previous bandwidth selections for the currently displayed user, institution, account, etc. In addition, the bandwidth history display 501 can show bandwidth histories for multiple users or accounts, including for the current user or account.

The service level agreement display 502 displays an applicable service level agreement that controls the bandwidth selection for the communication link. Each user, institution user, account, etc., can be subject to an individually tailored service level agreement, as previously discussed.

The bandwidth selection indicium display 503 displays two or more bandwidth indicia 514 that can be used to select a bandwidth level for a communication link and for a communication session. Although three such bandwidth indicia 514 are shown, it should be understood that any number can be employed. The bandwidth indicia 514 can be accompanied by text or other graphical indicators that signify an accompanying bandwidth level. The bandwidth indicia 514 can comprise graphical buttons, checkboxes, or other selectors that correlate a display region to a bandwidth level, when selected. For example, a user can position a cursor or highlighting over a selector that is labeled "MEDIUM". When the user clicks on or otherwise selects this bandwidth indicia 514, the resulting user input represents an available medium bandwidth level.

The bandwidth selection indicium display 503 further displays a currently selected bandwidth indicator 515. The currently selected bandwidth indicator 515 can comprise shading, highlighting, a check or X, etc., that indicates a currently selected (and currently in use) bandwidth level. This is done so that the user can visually determine the selected bandwidth level.

It should be understood that the display screen 500 in one embodiment can include the information of both FIG. 4 and FIG. 5. For example, such a display can show all applicable or available communication links and/or link segments. In addition, this display can show a graphical bandwidth selection indicium display 503 for each link or link segment. Moreover, this display can show a bandwidth history display 501 and a service level agreement display 502 for each link or link segment. As a result, the user or operator can control or select the bandwidth level in various communication links or segments, as desired or needed.

The communication control system and method according to the invention provide several benefits. The system and method perform a bandwidth selection that enables a user to control and select a communication bandwidth for a communication session. The system and method provide an easy, quick, and simple bandwidth selection. Consequently, the user can perform a graphical bandwidth selection, including a one-click bandwidth selection. The system and method advantageously display a current bandwidth selection to the user. The system and method advantageously display historical bandwidth selections and bandwidth use to the user. The system and method advantageously display a service level agreement for reference by the user, and can show pricing, options, and limitations of each bandwidth selection option. As a result, the user can advantageously select an optimal bandwidth for a communication session, such as for a mass data transfer. The bandwidth selection according to the invention is advantageous for data mirroring operations of local data to a storage site, such as to a SAN, for example.

What is claimed is:

1. A communication control system for bandwidth level selection in a communication network, the communication control system comprising:
   a display device;
   an input device;
   a communication interface configured to transfer a bandwidth level selection command to the communication network; and
   a processing system configured to display a graphical bandwidth level selection indicium and a bandwidth history, including previous bandwidth selections on the display device, with the graphical bandwidth level selection indicium comprising two or more bandwidth level indicia, receive a user input from the input device in response to the graphical bandwidth level selection indicium, with the user input selecting a particular bandwidth level indicium of the two or more bandwidth level indicia, translate the user input into the bandwidth level selection command, and transfer the bandwidth level selection command to the communication interface;

wherein the user input generates the bandwidth level selection command for a communication session in the communication network.

2. The system of claim 1, wherein the bandwidth level selection command is transferred to at least a first bandwidth controller associated with a first switch of the communication network, with the first bandwidth controller controlling a communication session bandwidth.

3. The system of claim 1, wherein the bandwidth level selection command is transferred to at least a first bandwidth controller associated with a first switch and a second bandwidth controller associated with a second switch of the communication network, with the first and second bandwidth controllers controlling a communication session bandwidth.

4. The system of claim 1, wherein the communication session comprises a data mirroring session.

5. The system of claim 1, wherein the communication session comprises a data mirroring session to a Storage Area Network (SAN).

6. The system of claim 1, wherein the user input comprises a one-click bandwidth level selection for the communication session.

7. The system of claim 1, wherein the processing system is further configured to generate a currently selected bandwidth level indicator on the display device, with the currently selected bandwidth level indicator graphically indicating a currently selected bandwidth level.

8. The system of claim 1, wherein the processing system is further configured to generate a bandwidth level history display as part of the bandwidth history on the display device.

9. The system of claim 1, wherein the processing system is further configured to generate a service level agreement display on the display device.

10. A method for bandwidth level selection in a communication network, the method comprising:
    displaying a graphical bandwidth level selection indicium, with the graphical bandwidth level selection indicium comprising two or more bandwidth level indicia;
    displaying a bandwidth history, including previous bandwidth selections;
    receiving a user input in response to the graphical bandwidth level selection indicium, with the user input selecting a particular bandwidth level indicium of the two or more bandwidth level indicia;
    translating the user input into a bandwidth level selection command; and
    transferring the bandwidth level selection command to the communication network;
    wherein the user input generates the bandwidth level selection command for a communication session in the communication network.

11. The method of claim 10, wherein the bandwidth level selection command is transferred to at least a first bandwidth controller associated with a first switch of the communication network, with the first bandwidth controller controlling a communication session bandwidth.

12. The method of claim 10, wherein the bandwidth level selection command is transferred to at least a first bandwidth controller associated with a first switch and a second bandwidth controller associated with a second switch of the communication network, with the first and second bandwidth controllers controlling a communication session bandwidth.

13. The method of claim 10, wherein the communication session comprises a data mirroring session.

14. The method of claim 10, wherein the communication session comprises a data mirroring session to a Storage Area Network (SAN).

15. The method of claim 10, wherein the user input comprises a one-click bandwidth level selection for the communication session.

16. The method of claim 10, wherein the processing system is further configured to generate a currently selected bandwidth level indicator on the display device, with the currently selected bandwidth level indicator graphically indicating a currently selected bandwidth level.

17. The method of claim 10, with the graphical bandwidth level selection indicium further comprising a currently selected bandwidth level indicator that graphically indicates a currently selected bandwidth level, and further comprising:
    displaying a selected bandwidth level in the currently selected bandwidth level indicator corresponding to the user input.

18. The method of claim 10, wherein the processing system is further configured to generate a bandwidth level history display as part of the bandwidth history on the display device.

19. The method of claim 10, wherein the processing system is further configured to generate a service level agreement display on the display device.

* * * * *